United States Patent
Altwasser et al.

(10) Patent No.: US 6,622,921 B2
(45) Date of Patent: *Sep. 23, 2003

(54) IDENTIFICATION ELEMENT

(75) Inventors: Richard Altwasser, Neuthard (DE); David Robson, Crowborough (GB)

(73) Assignee: Meto International GmbH, Hirschhorn (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/318,609

(22) Filed: May 26, 1999

(65) Prior Publication Data

US 2003/0019941 A1 Jan. 30, 2003

(30) Foreign Application Priority Data

Aug. 8, 1998 (DE) ............................ 198 35 965
Jun. 23, 1998 (DE) ............................ 198 27 805

(51) Int. Cl.⁷ ............................................. G06K 19/06
(52) U.S. Cl. ....................................... 235/492; 235/487
(58) Field of Search ................................. 235/492, 487; 343/867, 893, 895, 741, 742; 361/737; 340/10.1–10.6, 572.1–572.9

(56) References Cited

U.S. PATENT DOCUMENTS

| | | | | |
|---|---|---|---|---|
| 4,818,312 A | * | 4/1989 | Benge ........................ 156/52 |
| 5,142,767 A | * | 9/1992 | Adams et al. ............. 29/602.1 |
| 5,291,180 A | * | 3/1994 | Reeb ....................... 340/572.5 |
| 5,321,240 A | * | 6/1994 | Takahira ..................... 235/380 |
| 5,430,441 A | * | 7/1995 | Bickley et al. ............ 340/10.2 |
| 5,436,441 A | * | 7/1995 | Inoue ........................ 235/487 |
| 5,541,399 A | * | 7/1996 | de Vall ...................... 235/491 |
| 5,574,470 A | | 11/1996 | de Vall ...................... 343/895 |
| 5,608,417 A | * | 3/1997 | de Vall ...................... 343/895 |
| 5,645,932 A | * | 7/1997 | Uchibori .................... 428/347 |
| 5,801,521 A | * | 9/1998 | Mizoguchi et al. ........ 323/282 |
| 6,008,993 A | * | 12/1999 | Kreft ......................... 361/737 |
| 6,018,298 A | * | 1/2000 | Endo et al. ............... 340/572.5 |
| 6,036,099 A | * | 3/2000 | Leighton .................... 235/488 |
| 6,111,544 A | * | 8/2000 | Dakeya et al. .......... 343/700 MS |
| 6,166,911 A | * | 12/2000 | Usami et al. ............... 361/737 |
| 6,181,287 B1 | * | 1/2001 | Beigel ........................ 343/741 |
| 6,373,708 B1 | * | 4/2002 | Ando et al. ................ 361/737 |
| 6,394,357 B1 | * | 5/2002 | Altwasser et al. .......... 235/492 |

FOREIGN PATENT DOCUMENTS

| | | | |
|---|---|---|---|
| DE | 19527359 A1 | | 2/1997 |
| EP | 0507360 | * | 10/1992 |
| GB | 2196184 | * | 4/1988 |
| WO | WO 98/11507 | | 3/1998 |

\* cited by examiner

*Primary Examiner*—Karl D. Frech
*Assistant Examiner*—Jamara A Franklin
(74) *Attorney, Agent, or Firm*—Jones, Tullar & Cooper, P.C.

(57) ABSTRACT

The present invention relates to an identification element having an integrated circuit and an antenna coil connected to the integrated circuit.

The antenna coil comprises a lower conducting track and an upper conducting track. Each track includes a plurality of turns, with the two tracks being arranged on either side of a dielectric layer. The relative position of the two tracks is such that they overlap substantially only in one selected area or in two selected areas.

2 Claims, 3 Drawing Sheets

IDENTIFICATION ELEMENT

FIELD OF THE INVENTION

This invention relates to an identification element having an integrated circuit and an antenna coil connected to the integrated circuit(RFID transponder)

BACKGROUND OF THE INVENTION

The advantage of RFID transponders compared to the bar-codes predominantly used in particular in the goods marking sector is that they permit a direct exchange of information, meaning that no visual contact is needed between the interrogating device and the transponder for the information transfer. Unlike bar-codes, furthermore, it is an easy matter with RFID transponders to change their information content directly as and when required.

It will be understood, of course, that RFID transponders may find application in the most diverse areas, particularly in the fields of production, further processing and handling of goods as well as in the security sector. Examples include the identification marking of people and animals, the identification marking of baggage and packages, particularly at airports and post offices, and the identification marking of vehicles during their production or in multistory car parking garages.

The disadvantage of the known RFID transponders compared to bar-codes is the immense difference in price between the two elements. This is also the reason why the use of RFID transponders in the sales sector has been restricted so far to fringe areas. In particular there has been no interest to date in using RFID transponders to present price information or other data when selling mass products in department stores and warehouses, considering that an RFID transponder costs in the region of DM 10. This naturally makes their use as disposable identification markers completely out of the question.

RFID transponders are constructed as either passive or active elements. If the RFID transponder is used as an active element, the housing enclosing the integrated circuit contains an additional energy source usually in the form of a battery. RFID transponders are able to operate in the most diverse frequency ranges, for example, in the low frequency range at 125 kHz, in the medium frequency range at 13.56 MHz, or in the microwave range at typically 2.45 GHz. The present invention relates preferably—but by no means exclusively—to passive transponders operating in the medium frequency range.

A data carrier with an integrated circuit is known in the art from European Patent EP 0 682 321 A2. The data carrier disclosed there is comprised of a card body and an integrated circuit connected electrically via contact elements to at least one coil composed of one or several layers. The elements combine to form a resonant circuit which operates at a predetermined resonant frequency. The purpose of the coil is to supply energy and/or to exchange the data of the integrated circuit with external devices. Circuit and contact elements are each constructed as a separate module.

The manufacturing cost of this known configuration of a transponder is so high that it is only suitable for use on up-market products. It is completely unsuited for use on mass products.

A method of bonding an integrated circuit to a resonant circuit mounted on a flexible substrate and a corresponding transponder is described in European Patent EP 0 821 406 A1. The resonant circuit disclosed is formed of two electrically conductive patterns arranged on either side of the flexible substrate. The resonant circuit has a certain inductance and a certain capacitance. To ensure a reliable bond between the integrated circuit and the resonant circuit, the bonding area on the flexible substrate is cleaned. Then the integrated circuit is connected to the resonant circuit by a technique referred to as wire bonding which is known from semiconductor technology. To prevent the bond from being destroyed by external impact, a protective coating is applied to the integrated circuit and the bonding area.

A disadvantage of this known method and known transponder is the relatively high cost for the individual parts and for the manufacture, considering that it is absolutely necessary, following bonding the integrated circuit to the resonant circuit, to apply a protective coating to the circuit and the bonding area. Typically, transponders are integrated into labels. Because in the area of the chip the transponder is substantially thicker than in the remaining areas, this presents major printing problems using, for example, a thermal printer for printing labels. Moreover, the conducting patterns forming the resonant circuit are applied to the substrate by etching. Etching is a relatively expensive process which, in addition, poses a severe environmental pollution problem.

SUMMARY OF THE INVENTION

It is an object of the present invention to provide an economically priced and reliably operating identification element.

This object is accomplished in that the antenna coil is comprised of a lower conducting track and an upper conducting track, that each track includes a plurality of turns, that the two tracks are arranged on either side of a dielectric layer, and that the relative position of the two tracks is such that they overlap substantially only in one or in two selected areas.

The advantages of the present invention reside in that the inductance of the antenna coil is relatively high as a result of the high number of turns of the two tracks. In particular, the inductance can be dimensioned such that, with a predetermined interrogation field in a predetermined space, the output voltage is sufficient to activate, that is, operate the integrated circuit. Furthermore, the feature involving overlapping of the two tracks essentially only at their inner and/or outer ends produces the effect that these areas make the major contribution to the capacitance of the antenna coil, while the contributions made by the remaining areas of track overlap (that is, the areas in which the tracks intersect) are vanishingly small. This makes it possible to obtain a higher inductance and hence again a higher induced voltage for operating the integrated circuit at the predetermined excitation frequency of the antenna coil.

In an advantageous aspect of the present invention, provision is made for the two antenna coils to be electrically interconnected in one of the two areas of track overlap, preferably in the outer area of track overlap.

In an advantageous further feature of the identification element of the present invention, provision is made for the integrated circuit to be a non-encapsulated chip. Obviously, this presents an extremely economical solution. In cases where the identification element is integrated into a label, printing as by a thermal printer is in addition substantially facilitated because a non-encapsulated transponder is substantially thinner than an encapsulated transponder.

Preferably, the conducting tracks are parts which are die-stamped from a metal foil material. A very low-cost method of manufacturing resonant labels is known in the art from European Patent EP 0 655 705 A1. The manufacturing method disclosed in this patent can be employed in the manufacture of the antenna coil.

According to an advantageous aspect of the solution of the present invention, it is proposed using a dielectric adhesive for the dielectric layer. This aspect is equally described in the European Publication referred to above.

The operating voltage of the integrated circuit, meaning the non-encapsulated chip, is of the order of 2 volts. In an advantageous aspect of the identification element of the present invention, provision is made for the number of turns of the tracks, which number is proportional to the inductance of the antenna coil and hence to the induced voltage, and for the size of the area of track overlap to be selected such that the output voltage of the antenna coil is in the voltage range with the predetermined interrogation field in a predetermined space.

To compensate for manufacturing tolerances, an advantageous embodiment of the identification element of the present invention provides for the antenna coil, following manufacture, to be tunable to the desired resonant frequency by the application of heat and pressure in the selected area or the selected areas. Preferably, tuning is performed by adjusting the distance between the two tracks in the area of track overlap by means of a heatable ram in such fashion that the antenna coil supplies the resonant frequency required for activation of the integrated circuit. The possibility also exists for such fine tuning to take place at a time when the integrated circuit is already bonded to the antenna coil.

According to a preferred embodiment of the identification element of the present invention, the antenna coil and the integrated circuit are interconnected through an electrically conducting adhesive bond. The adhesive bond used is one of the isotropic or anisotropic adhesive bonds well known from the field of semiconductor production. This is a very low-cost bonding method. In addition, it is readily applicable to the non-encapsulated chips utilized and the antenna coil described, which is fabricated from die-stamped tracks, and is hence eminently suitable.

In an advantageous aspect of the identification element of the present invention, the two conducting tracks of the antenna coil are of essentially like dimensions, and the conducting tracks are wound in opposing directions.

Furthermore, the end of the outer turn and the end of the inner turn of at least one of the two tracks preferably has a greater width than the balance of the track areas. As mentioned previously, the selected areas of track overlap lie in these inner and/or outer ends of the antenna coil. Because these areas are wider than the remaining track areas, a concentration of capacitance occurs in the corresponding area of track overlap. In the proximity of the overlap area, the chip, that is, the integrated circuit, is connected with the antenna coil. A concentrated total capacitance is substantially more favorable than a total capacitance presenting itself as the sum of a plurality of individual capacitances, because the total capacitance and hence the energy for operating the integrated circuit can thus be easily focused at the point where it is needed, that is, in the proximity of the chip.

In accordance with an advantageous embodiment of the identification element of the present invention, the transponder, that is, the chip, is located between the two inner turns of the two tracks in the area of an axis of symmetry of the identification element. This arrangement is of great advantage in particular in conjunction with the further feature of the identification element subsequently described. This further feature makes provision for two webs of a dielectric foil between the two conducting tracks and outside the area in which the chip is disposed. This foil increases the relative distance of the two conducting tracks, thus preventing a short circuit from occurring in the areas of overlap of the two conducting tracks which would deactivate the antenna coil. The dielectric foil is preferably made of polyester.

The present invention will be explained in more detail in the following with reference to the accompanying drawings.

DESCRIPTION OF THE PREFERRED EMBODIMENTS

Figure 1:
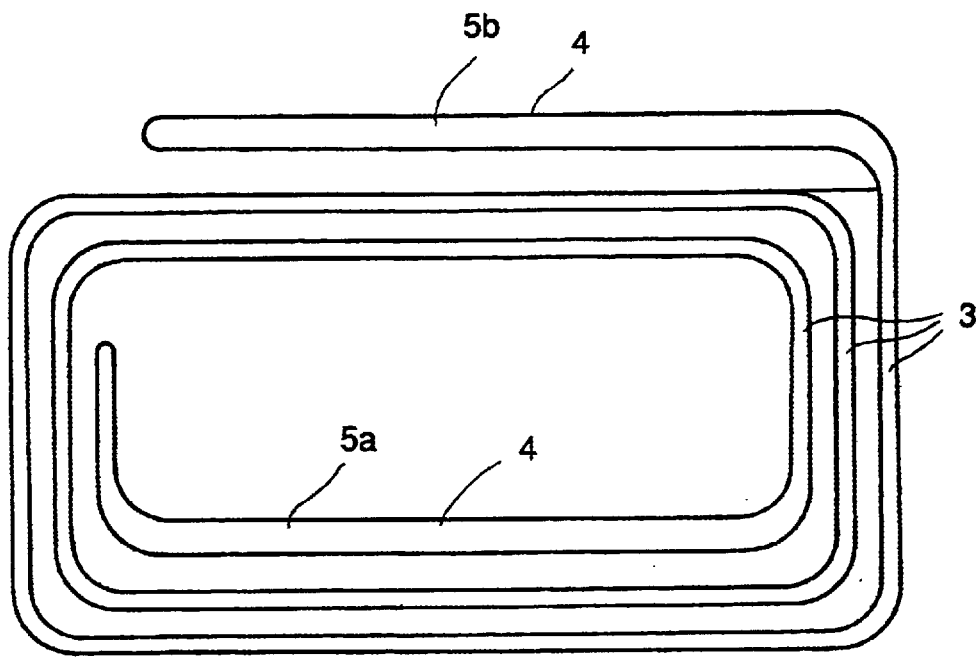
FIG. 1 is a top plan view of the lower conducting track.
Figure 2:
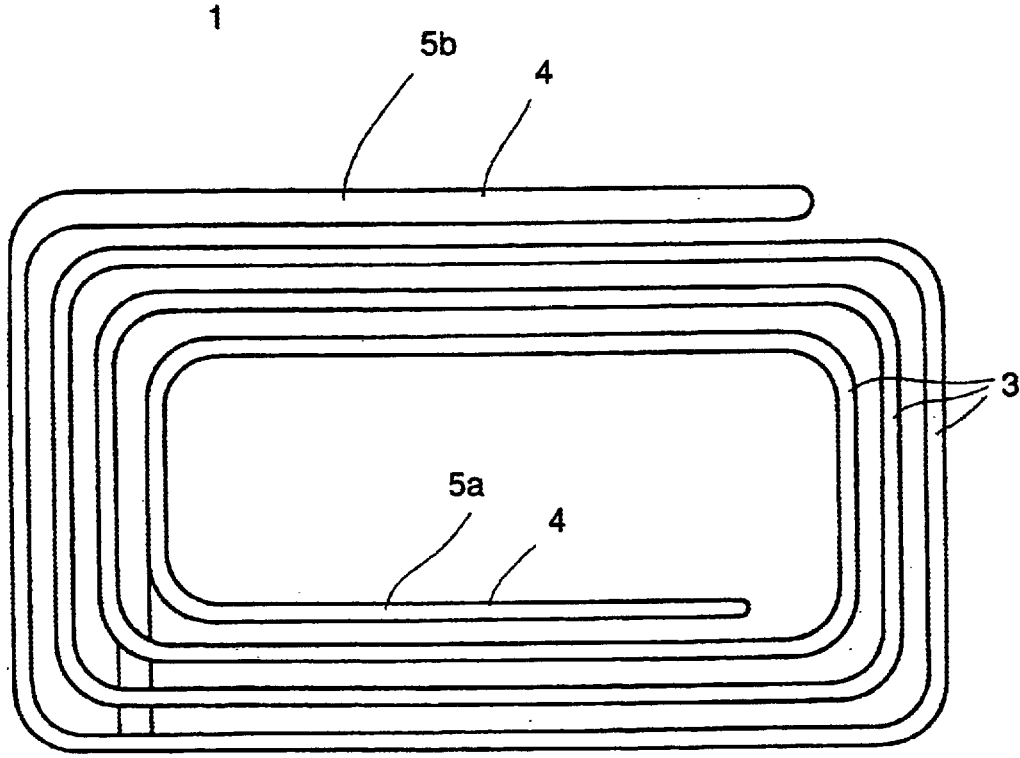
FIG. 2 is a top plan view of the upper conducting track.
Figure 3:
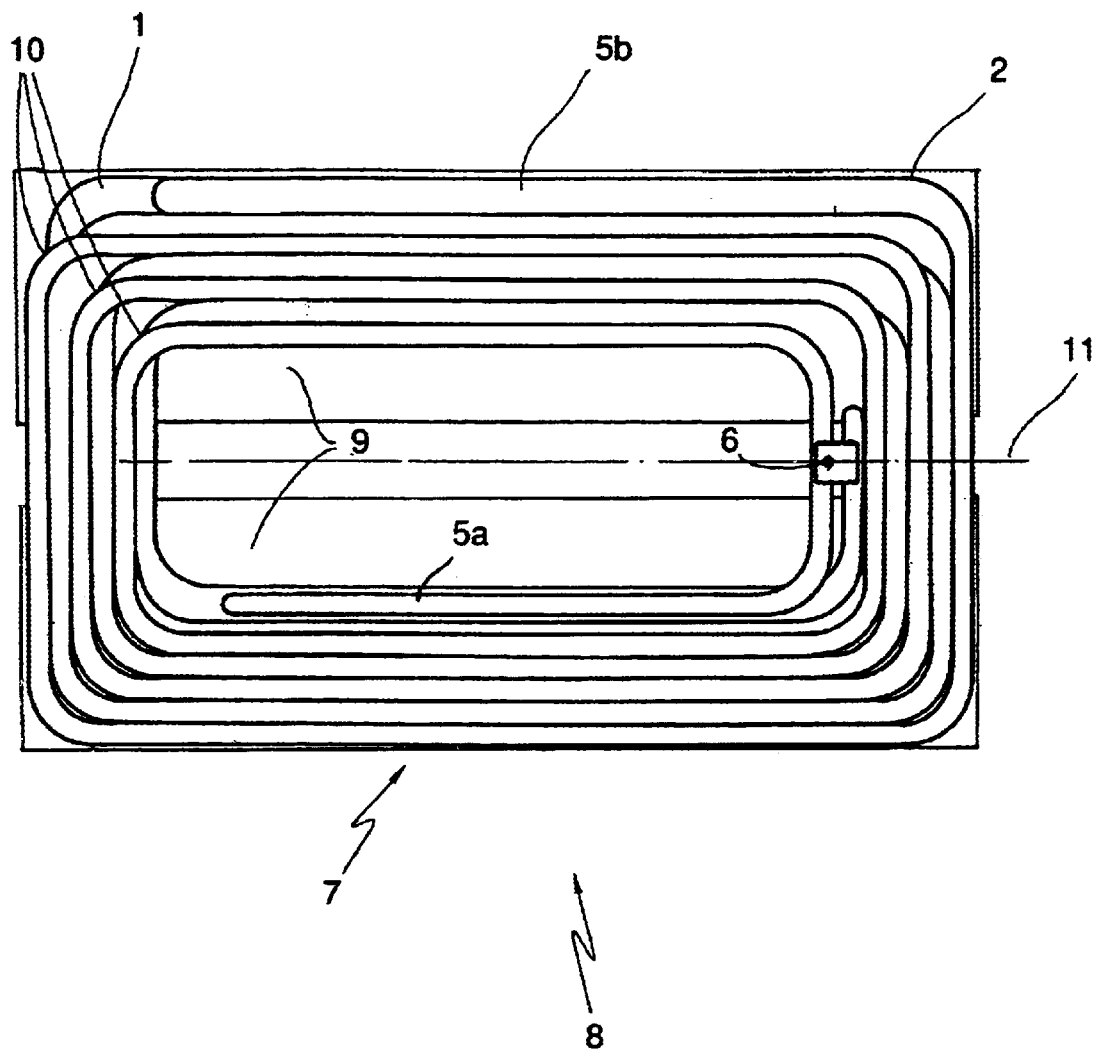
FIG. 3 is a top plan view of a configuration of the identification element of the present invention with both tracks.

FIG. 1 shows a top plan view of the lower conducting track 1 of the antenna coil 7. While the lower track 1 has nearly three turns 3, the upper track 2—as becomes apparent from the top plan view of FIG. 2—has nearly four turns 3. The relatively high number of turns results in a high inductance, ultimately providing a sufficiently high induced voltage for activating the integrated circuit 6. The two tracks 1, 2 are wound in opposing directions. FIG. 3 shows the complete identification element 8, including the two conducting tracks 1, 2.

The inner end 5a and the outer end 5b of the lower track 1 and the outer end 5b of the upper track 2 are of greater width than the remaining areas of the tracks 1, 2. Preferably, the two tracks 1, 2 are die-stamped from a metal foil, in particular an aluminum foil. It will be understood, of course, that the foil could also be fabricated from another conductive metal, as from copper.

In order to obtain the antenna coil 7, a dielectric layer 4 is arranged between the two tracks 1, 2. The two tracks 1, 2 are arranged in such relative position that they overlap essentially in selected areas 5a, 5b only. According to a preferred embodiment, the two tracks 1, 2 are electrically interconnected in the overlap area 5b of the outer turns 3. In the simplest case, bonding is performed by punching a hole through the two tracks in the area of track overlap 5b. Other bonding methods are equally applicable, however.

The dielectric layer 4 interposed between the two tracks 1, 2 is preferably a dielectric hot-melt adhesive. The dielectric layer 4 insulates the two tracks 1, 2 electrically. On account of the offset positioning of the two tracks 1, 2, the main contribution of the capacitance is made by the areas of track overlap 5a, 5b, while the contributions to the total capacitance made by the remaining overlap areas 10, in which the two tracks 1, 2 intersect, are negligibly small. With this configuration, the capacitance and hence the energy of the antenna coil is concentrated at a point where it is needed, that is, in the immediate vicinity of the chip.

The integrated circuit 6, meaning the preferably non-encapsulated chip 6, is disposed between the end area of the lower track 1 and the end area of the upper track 2 in the immediate vicinity of center line 11 of the antenna coil 7.

Bonding between the chip 6 and the tracks 1, 2 is preferably performed by means of a method referred to as flip-chip bonding using an electrically conducting adhesive. It will be understood, of course, that further bonding methods known from semiconductor manufacture are equally applicable in connection with the present invention.

To prevent a short circuit from occurring in the overlap areas 10 which would deactivate the antenna coil 7 and with it the identification element 8, provision is made for an additional dielectric foil 9 or some other additional dielectric layer at least in these areas 10.

Figure 4:
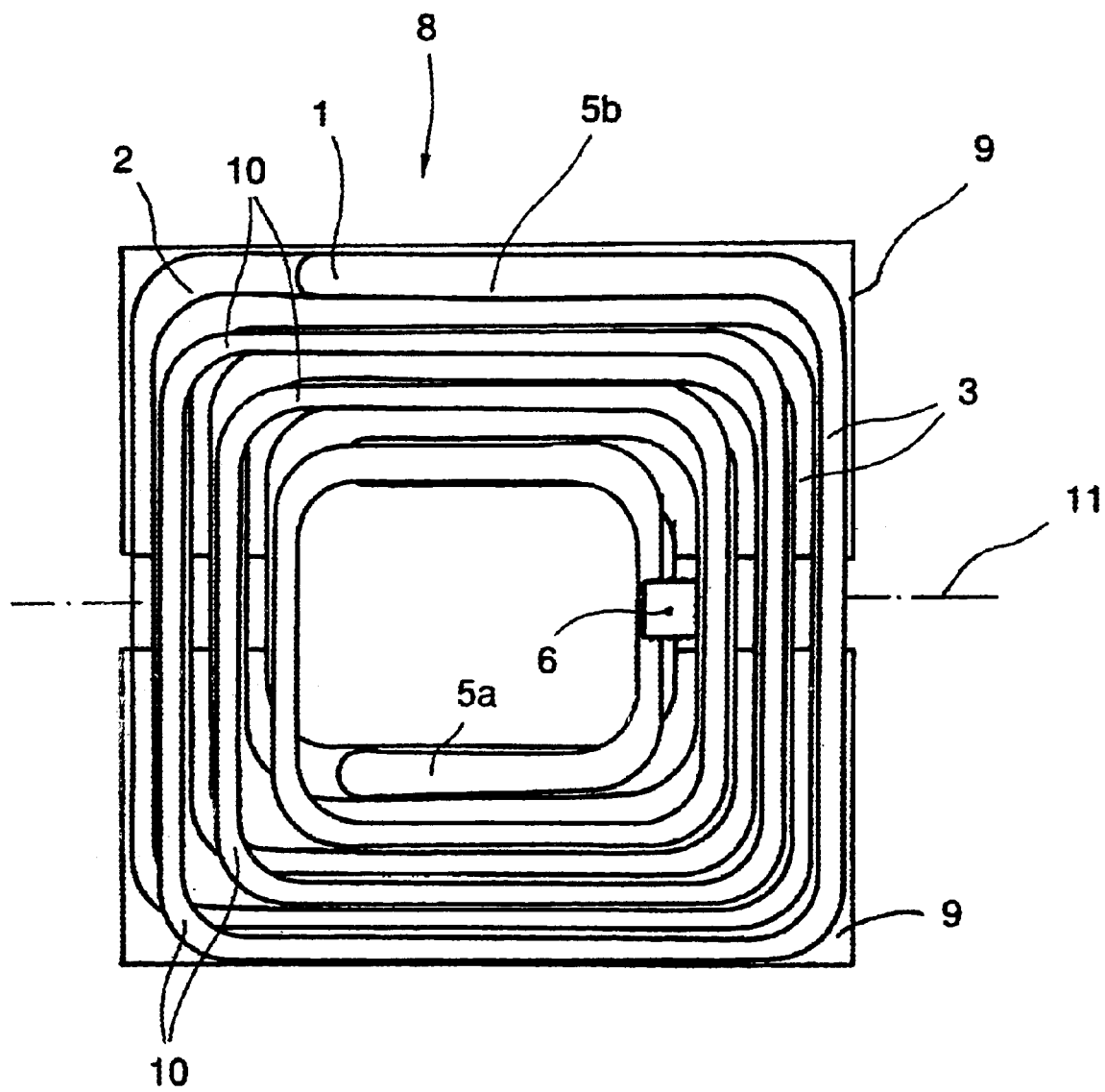
FIG. 4 is a top plan view of a further configuration of the identification element of the present invention.

FIG. 4 shows a further embodiment of the identification element 8 of the present invention. It differs from the identification element 8 shown in the previous Figures only in design.

What is claimed is:

1. An identification element, comprising:

an integrated circuit;

an antenna coil connected to said integrated circuit, said antenna coil comprising a lower conducting track and an upper conducting track, each track including a plurality of turns; and a dielectric layer interposed between the upper and lower conducting tracks, wherein a relative position of the upper and lower conducting tracks is such that said upper and lower conducting tracks overlap substantially in one of: one selected area, and in two selected areas, wherein an end of an outer turn and an end of an inner turn of at least one of said upper and lower conducting tracks has a greater width than remaining turns of a corresponding track.

2. An identification element, comprising:

an integrated circuit;

an antenna coil connected to said integrated circuit, said antenna coil comprising a lower conducting track and an upper conducting track, each track including a plurality of turns;

a dielectric layer interposed between the upper and lower conducting tracks, wherein a relative position of the upper and lower conducting tracks is such that said upper and lower conducting tracks overlap substantially in one of: one selected area, and in two selected area; and an additional dielectric layer interposed between said upper and lower conducting tracks and outside an area where said integrated circuit is disposed.

* * * * *